(12) United States Patent
Botella Pla et al.

(10) Patent No.: US 8,230,541 B2
(45) Date of Patent: Jul. 31, 2012

(54) MODULE FOR SUPPORTING ROTARY BRUSHES USED IN VEHICLE-WASHING AND-DRYING MACHINES

(75) Inventors: Francisco Botella Pla, La Alcudia (ES); Yolanda Tomás Puchades, La Alcudia (ES)

(73) Assignee: Istobal, S.A., La Alcudia (Valencia) (ES)

( * ) Notice: Subject to any disclaimer, the term of this patent is extended or adjusted under 35 U.S.C. 154(b) by 0 days.

(21) Appl. No.: 13/086,430

(22) Filed: Apr. 14, 2011

(65) Prior Publication Data

US 2011/0247161 A1   Oct. 13, 2011

(51) Int. Cl.
*B60S 3/06* (2006.01)
(52) U.S. Cl. ................... 15/53.2; 15/97.3; 15/230.16
(58) Field of Classification Search .............. 15/53.2, 15/53.3, 230.14, 230.16, 97.3
See application file for complete search history.

(56) References Cited

U.S. PATENT DOCUMENTS

| | | | | |
|---|---|---|---|---|
| 4,004,316 | A * | 1/1977 | Ali ........................... | 15/230.16 |
| 6,035,482 | A * | 3/2000 | Belanger et al. ........... | 15/230.14 |
| 6,564,418 | B1 * | 5/2003 | Favagrossa ................ | 15/230.16 |

\* cited by examiner

*Primary Examiner* — Randall Chin
(74) *Attorney, Agent, or Firm* — Wenderoth, Lind & Ponack, LLP.

(57) ABSTRACT

A module for supporting rotary brushes and fringes of the brushes for vehicle-washing machines and vehicle-drying machines is provided. The module comprises a pair of complementary components of annular structure that are detachably coupled together, face-to-face, by pairs of axial rods with a free end and an open cavity bounded by a cylindrical wall portion around the axial rods. The axial rods include end sections that are fitted into complementary holes of the complementary component. The axial rods, which are arranged on the periphery of the pair of complementary components, fasten fringes and supporting members for front bristles or combinations thereof.

20 Claims, 6 Drawing Sheets

MODULE FOR SUPPORTING ROTARY BRUSHES USED IN VEHICLE-WASHING AND-DRYING MACHINES

OBJECT OF THE INVENTION

The present invention, as the title of this specification states, refers to a module for supporting rotary brushes used in vehicle-washing and -drying machines.

These washing machines comprise rotary brushes formed by a series of modules coupled to a shaft that receives rotary motion from a motor.

Thus, the invention is intended to support conventional fringes or strips arranged around the perimeter of the module of the invention, so that it presents a characteristic dismantleable structure in order to facilitate the installation of the strips or fringes, and also to facilitate the separation of different materials (the module itself and strips) for its later recycling where appropriate, since these are different materials and therefore need different recycling processes. The fact of being dismantleable facilitates the replacement of the fringes or strips, by first disassembling the module for assembling thereof once the new strips are attached.

Another novelty of the invention focuses on a component that serves as a unit or connection for connecting small filament bundles in the form of bristles that will form as a whole the brush for cleaning vehicles.

Thus, with the addition of the new component mentioned in the previous paragraph, which basically consists of a radial supporting member, combined with the base structure of the invention, the means required for using the filaments or bristles, as an alternative or complement to the aforementioned fringes or strips are obtained.

BACKGROUND OF THE INVENTION

Currently, the rotary brushes for washing machines include a series of modules that support some strips or fringes, while said modules are coupled to a shaft rotated by a motor element.

These modules comprise a single component, and thus the strips are not removable and this is ecologically important, because recycling is not possible when dealing with different materials, which cannot be subjected to the same processes of sewage treatment.

DESCRIPTION OF THE INVENTION

In order to achieve the objectives and avoid the drawbacks mentioned in the preceding paragraphs, the invention proposes a module for supporting rotary brushes used in vehicle-washing and vehicle-drying machines.

Each rotary brush comprises a series of modules in which strips or fringes are anchored, while all these are fitted into a same shaft that receives a rotary motion from a motor element.

On this premise, the module of the invention is in principle characterized in that it comprises two components coupled together face-to-face, which are also dismantleable, thus accessing to the strips or fringes for replacing thereof, and in particular it is possible to separate the fringes from the module components when performing the recycling because these are different materials, needing to be subjected to various processes of sewage treatment.

The module components are characterized in that they comprise a ring structure with an angular profile, including in its contour holes and axial rods alternately distributed, so that the axial rods of one of the components will fit through their free ends into the complementary holes of the other paired component.

The connection of both components is ensured through the anchorage by elastic rebound of at least one of the end sections of the axial rods wherein the strips or fringes of the module are fasten.

Another feature of the invention is that each module component comprises an enveloping wall that surrounds each axial rod with the exception of an outer area through which the respective strip or fringe appears.

The geometry of the central opening of the module, through which the brush is coupled to the shaft, is also characteristic.

The geometry includes a polygonal configuration, while also comprises at least one axial shoulder which is complemented by a longitudinal slot of the brush shaft.

The module of the invention further comprises appendages as positioning marks, as well as complementary front lugs and perforations in order to facilitate the connection of the subsequent adjacent modules of the rotary brush when these are mounted on the shaft of the rotary brush.

The axial rods wherein the strips or fringes are attached have a characteristic conical configuration that favors the entry and exit of the fringes for the assembly and disassembling process.

The invention also comprises characteristic radial supporting members that are dismantleable coupled to at least some of the axial rods of the modules in replacement or combination with the referred fringes or strips. All of the radial supporting members comprise sets of front bristles in order to perform the vehicle washing and cleaning.

The strips and the supporting members can be simultaneously provided in the modules according to the present invention, such as mentioned above, the strips and the supporting members being arranged in respective axial rods of the modules.

Other features focus on the structure presented by the radial supporting members comprising a tubular body for coupling the axial rods and a base provided with a set of blind holes from which the groups of front bristles are projected, such groups of front bristles being precisely joined within the blind holes.

The fringes have a characteristic structure that generates a centered volume adjacent to the axial rods wherein the fringes are coupled, thus preventing the inner faces of the fringe branches from sticking together due to the humidity effect, soaps, waxes, etc.

Next, to facilitate a better understanding of this specification and being an integral part thereof, some figures wherein the object of the invention has been represented in an illustrative and not limitative manner, are attached.

DESCRIPTION OF THE PREFERRED EMBODIMENT

Figure 1:
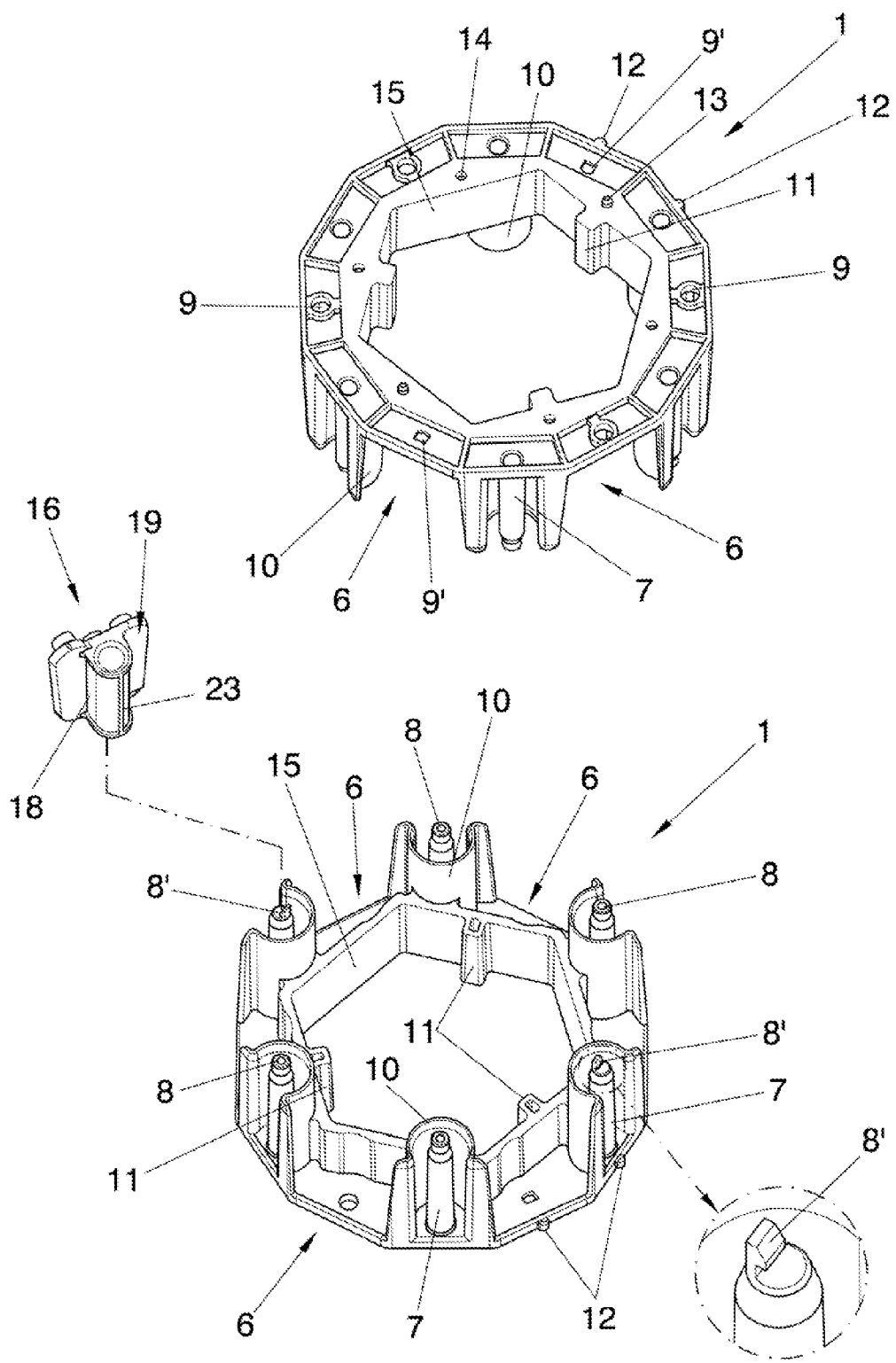
FIG. 1.—Shows an exploded perspective view of the module for supporting the rotary brushes used in vehicle-washing and -drying machines, object of the invention. It includes some fringes or strips, and may also include radial supporting members with bristles.
Figure 2:
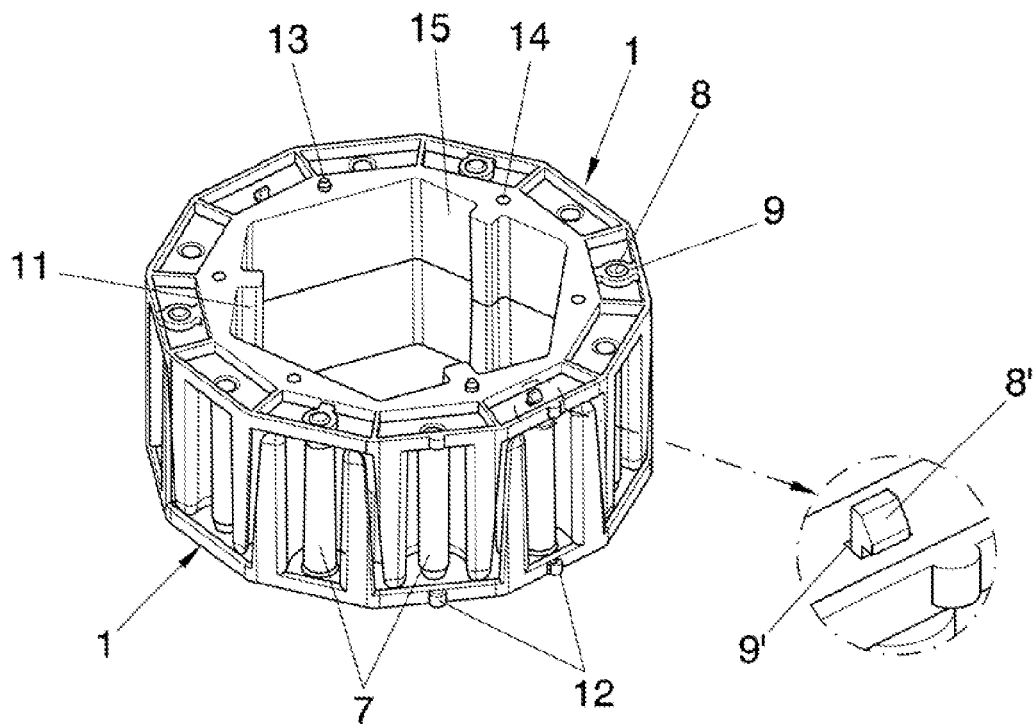
FIG. 2.—Shows a perspective view of the module in an assembled position.
Figure 3:
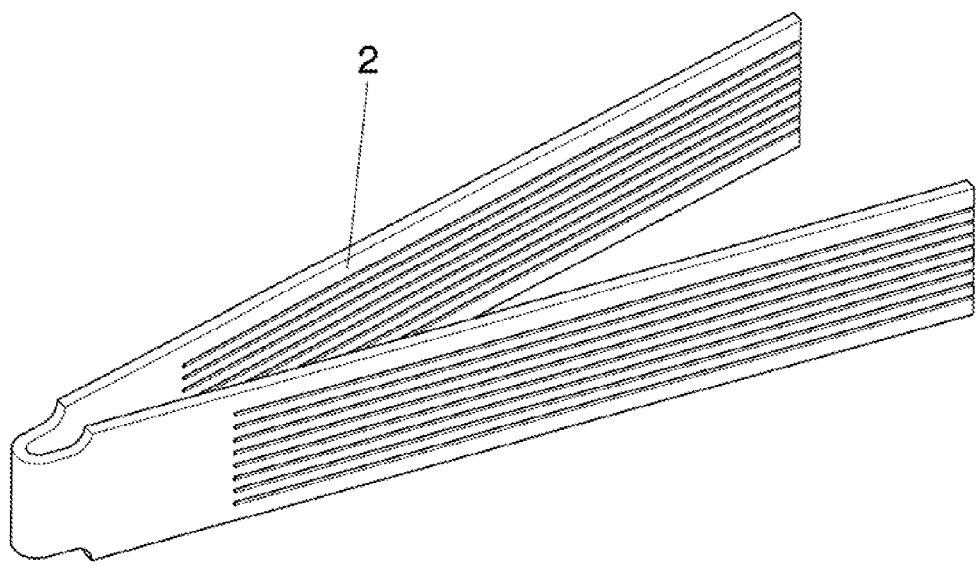
FIG. 3.—Shows a perspective view of a strip or fringe that is anchored to the module.
Figure 4:
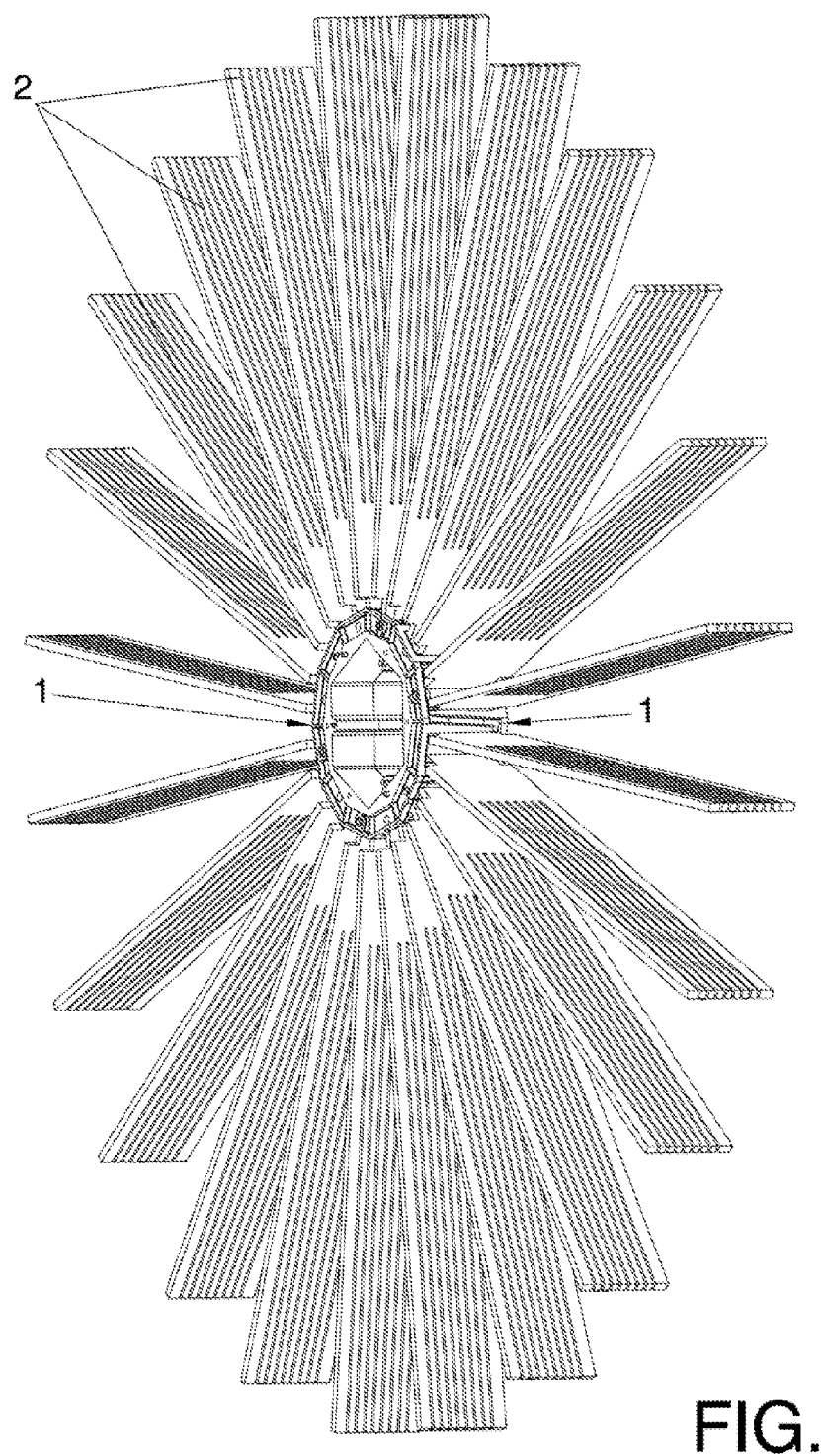
FIG. 4.—Shows a perspective view of a module with its respective radial strips or fringes.
Figure 5:
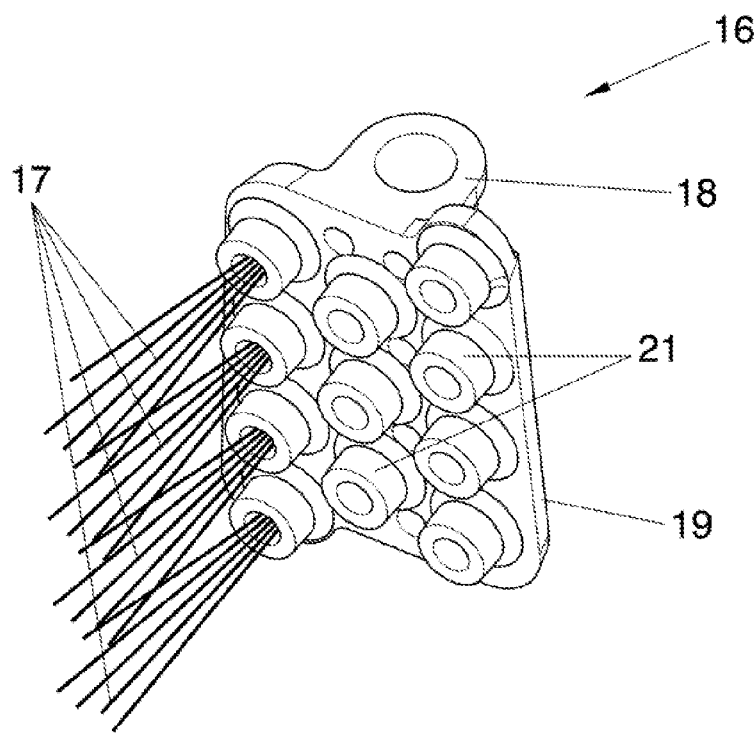
FIG. 5.—Shows a perspective view of one of the radial supporting members.
Figure 6:
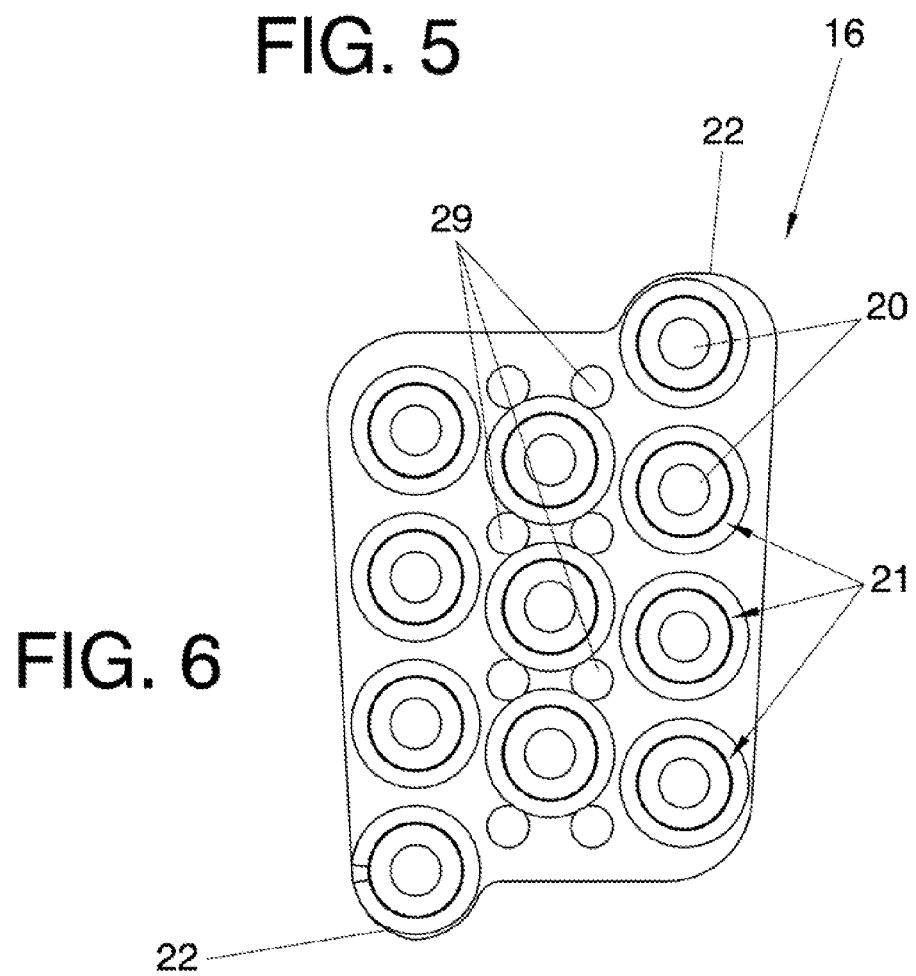
FIG. 6.—Shows a plan view of a radial supporting member.
Figure 7A:
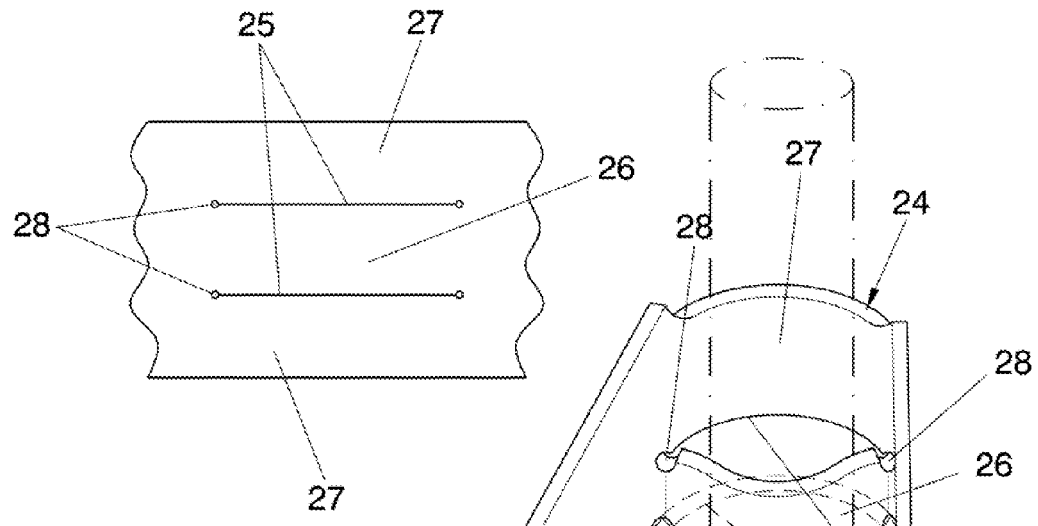
FIG. 7A.—Shows a view of a common section of a typical fringe.
Figure 7B:
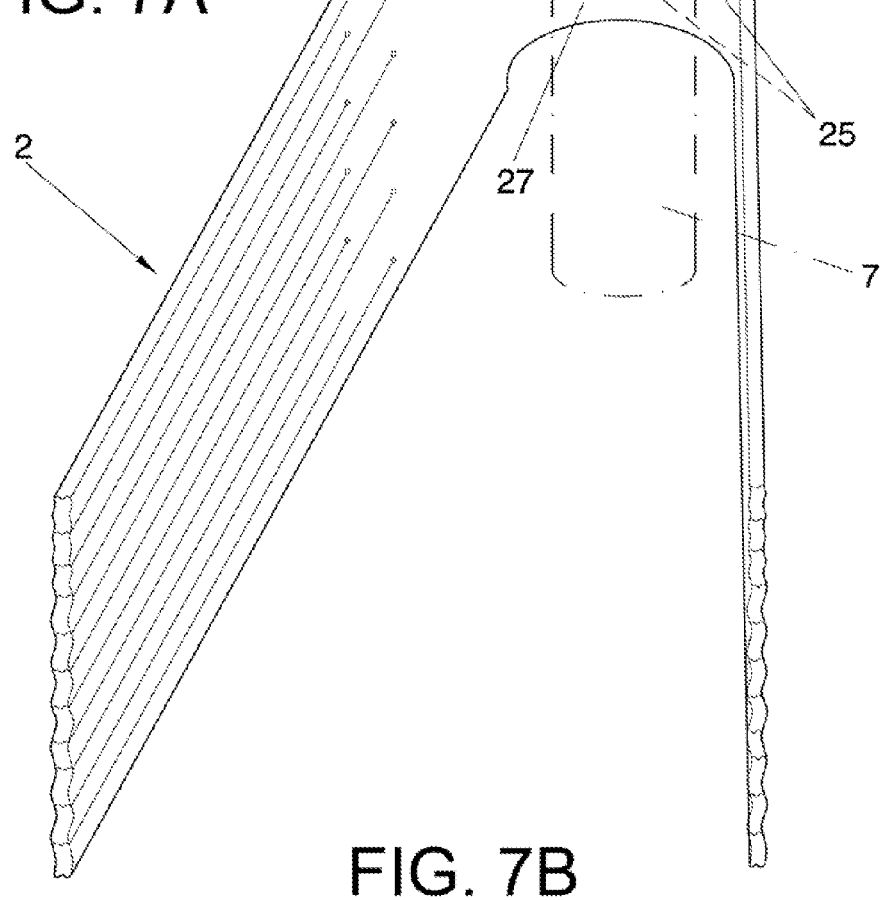
FIG. 7B.—Shows a perspective view of a typical fringe coupled to a module.
Figure 8:
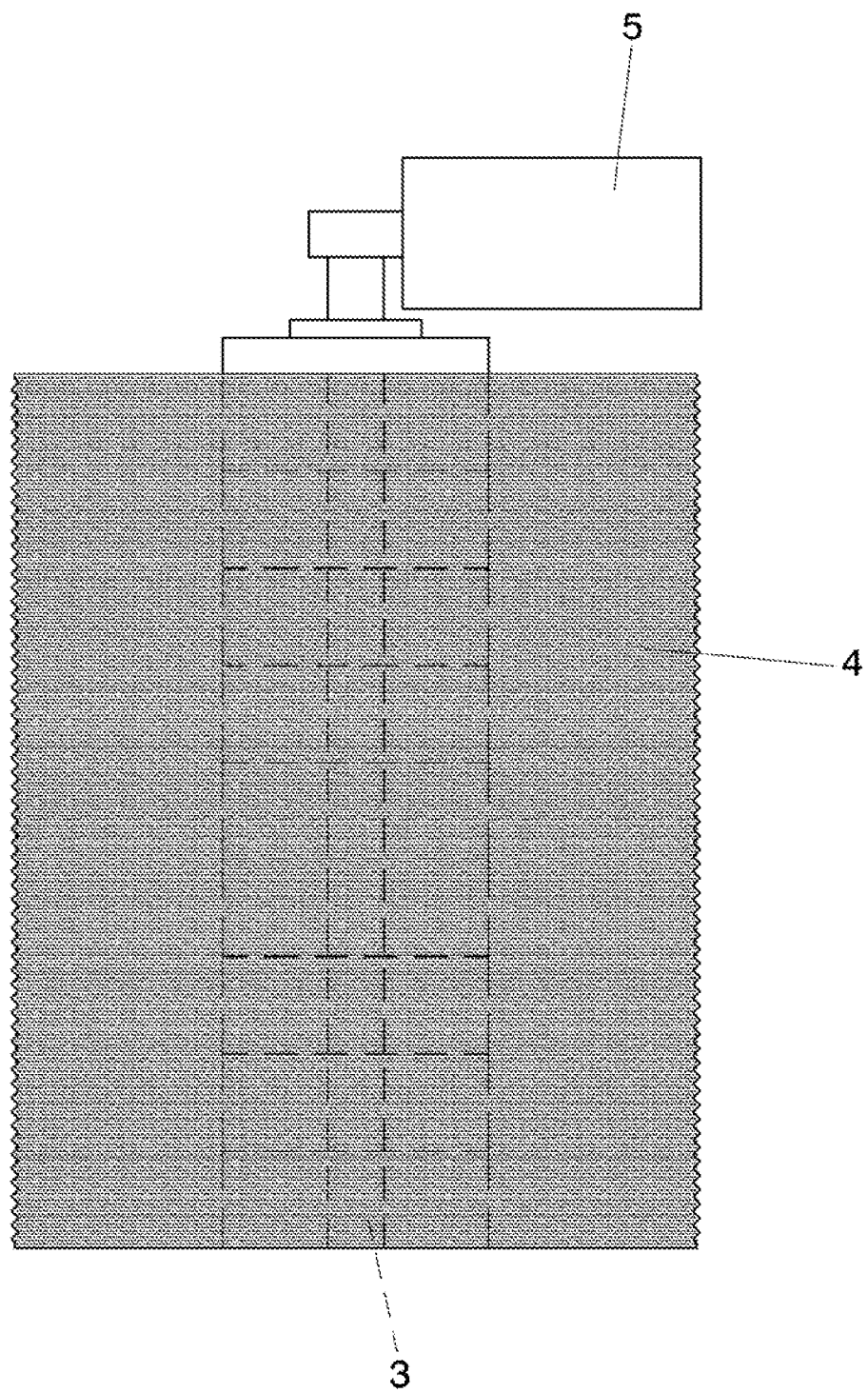
FIG. 8.—Shows a schematic view of a rotary brush that includes a series of modules of the invention coupled in the same shaft connected to a motor element.

Considering the numbering adopted in the figures, the module for supporting the rotary brushes making up the object of the invention comprises a structure formed by two dismantleable components 1 with angular section that are coupled together face-to-face, so that on the module the various strips or fringes 2 are mounted.

Several modules of the invention are mounted on the same shaft 3 of a rotary brush 4 which receives the motion from a motor element 5, the brush comprising the set of modules that include the strips or fringes 2.

The paired components 1 of the modules comprise within their perimeter holes 6 and axial rods 7 of conical configuration alternately distributed between each other, so that the axial rods 7 of one of the paired components 1 fit through their free end sections 8 into complementary holes 9 of the other paired component 1 in correspondence with the holes 6 of the latter. Some of such free sections of the axial rods 7 of one of the components include some end tabs 8' anchored by elastic rebound into the respective holes 9' of the other paired component 1.

Around the axial rods 7 an open cavity bounded by a cylindrical wall portion 10 which facilitates, just like the taper of the axial rods 7, the mounting of the strips or fringes 2 precisely coupled to the axial rods 7.

On the other hand, in the axial rods 7 some dismantleable coupled radial supporting members 16 can also be included, which comprise front bristles 17 for performing the vehicle cleaning in a washing tunnel in combination with or replacement of the strips or fringes 2.

The central opening of annular components 1 comprises a polygonal geometry defined by a number of inner faces 15, from some of which axial shoulders 11 which are complemented with respective longitudinal slots (not shown in the figures) defined in the central shaft 3 of the brush 4 are projected. The central opening could also have a circular shape with at least one axial shoulder 11.

In any case, the shaft 3 will be provided with one or more slots corresponding with the axial shoulders 11 of the annular components 1, the shaft and the central opening of the annular components 1 being able to have any matching or other appropriate section.

The module of the invention further comprises appendages 12 as positioning marks, as well as complementary front lugs 13 and perforations 14 in order to facilitate the connection of the subsequent adjacent modules of the rotary brush 4 when these are mounted thereon.

Each of the radial supporting members 16 comprises a tubular body 18 for coupling to the respective axial rod 7 and a base 19 provided with a set of blind holes 20 established at cylindrical portions 21 projecting from one of the faces of the base 19, with the tubular body 18 in correspondence with the other paired face of that base 19 of the radial supporting members 16.

The bristles 17 are intended to be embedded and fixed into the front blind holes 20 for performing the vehicle cleaning and washing. The mentioned blind holes 20 and therefore the bristles 17 have a staggered distribution.

The base 19 has a plant configuration in an approximately rectangular shape with a smooth convergence of its longer sides and with three longitudinal alignments of cylindrical portions 21, so that at diagonally opposite points, the base 19 has protruding components 22 in which some cylindrical portions 21 and their respective blind holes 20 for fixing the front bristles 17 are placed.

Moreover, the base 19 of the radial supporting members 16 comprises some perforations 29 in order to save material and to lighten the radial supporting members 16, this advantage being important for avoiding the overload of the assembly of the respective rotary brush.

The cylindrical portions 21 are arranged for covering the width of the base as much as possible, for this purpose providing a staggered distribution, such as mentioned above, or with certain angular offset.

The tubular body 18 of the radial supporting members 16 comprises a longitudinal partition wall 23 arranged in alignment with a generatrix of the tubular body 18, as a means for contacting the cylindrical-tubular wall 10 surrounding the pairs of annular components 1 that make up each module 1. This will improve the stability and a space for drainage is maintained, because these are areas subjected to much fluid passage during the washing process.

In some axial rods 7 some characteristic fringes 2 with a "U"-shaped configuration are coupled, two branches of which meet at a common section 24 which clamps the respective axial rod 7 all the way around, to this end that common section 24 of the fringes 2 being provided with at least one cut 25 separating the portions clamping the corresponding axial rod 7 by opposite areas, at least one of those portions being arranged between the inner facing faces of the fringe 2 branches.

Moreover, preferably, the mentioned common section 24 of the fringes will include a pair of cuts 25 that separate a central portion 26 and two side portions 27, which clamp the axial rod 7 by areas opposite to the clamping area of the central portion 26.

This characteristic structure presented by the common section 24 of the fringes 2 creates a space between the branches of that common section 24 which prevents the inner faces of the fringe 2 branches from sticking due to the humidity effect, soaps, waxes, etc.

On the other hand, it should be noted that the ends of the cuts 25 of the common section 24 of the fringes 2 end in some small terminal holes 28 in order to prevent possible tears in the flexible material of the fringes 2.

The invention claimed is:

1. A module for supporting rotary brushes for vehicle-washing machines and vehicle-drying machines, comprising a pair of complementary components of annular structure that are detachably coupled together, face-to-face, by pairs of axial rods with free ends and an open cavity bounded by cylindrical wall portions around the axial rods; wherein radial supporting members are detachably provided for at least one of the complementary components for supporting front bristles; and wherein the axial rods comprise end sections that are fitted into complementary holes of the complementary components; and wherein said axial rods, which are arranged on the periphery of said pair of complementary components, are configured to fasten fringes, the radial supporting members for supporting front bristles or, a combination of the fringes and the radial supporting members for supporting front bristles.

2. The module of claim 1, wherein the pair of complementary components are two identical components that have the holes and the axial rods alternately distributed, so that the axial rods of one of the components are placed into the holes of the other paired component.

3. The module of claim 1 wherein some of the end sections of the axial rods comprise end portions set into complementary holes of the other paired component.

4. The module of claim 3, wherein some of the end sections of the axial rods comprise anchoring tabs, which engage through elastic rebound on the edge of complementary holes of the other paired component.

5. The module of claim 1, wherein the pair of complementary components comprise lugs and front perforations for connecting the successive adjacent modules of a rotary brush.

6. The module of claim 1, wherein a central opening of the complementary components comprises a polygonal geometry formed by several faces.

7. The module of claim 6, wherein at least one of the faces of the central opening of the pair of complementary components includes an axial shoulder for engaging a slot of a shaft of a rotary brush assembly.

8. The module of claim 1, wherein each of the axial rods has a conical configuration.

9. The module of claim 1, wherein at least one of the complementary components comprises side positioning appendages.

10. The module of claim 1, wherein at least one of the complementary components has an angular profile.

11. The module of claim 1, wherein each of the radial supporting members comprises:
   a tubular body through which the radial supporting member is coupled to the respective axial rod;
   a base having first and second opposite faces, said tubular body projecting from the first face, while the second face is configured to have the front bristles projected therefrom.

12. The module of claim 11, wherein the second face of the base comprises cylindrical portions with blind holes configured to have the front bristles embedded and fixed therein.

13. The module of claim 12, wherein the cylindrical portions of the base are arranged in a staggered distribution.

14. The module of claim 12, wherein the base of each of the radial supporting members has a rectangular configuration including longer sides and shorter sides, the longer sides converging on one end of the base, while at diagonally opposite points the base comprises protruding components, in correspondence to which are cylindrical portions.

15. The module of claim 11, wherein the tubular body of each of the radial supporting members comprises a longitudinal partition wall that contacts a portion of one of the cylindrical wall portions.

16. The module of claim 11, wherein the base of each of the radial supporting members comprises perforations for reducing weight.

17. A combination of the module according to claim 1 and the fringes, wherein the fringes are coupled to the axial rods and each have a "U"-shaped configuration including two branches that face each other so as to have inner faces disposed face-to-face with each other, the two branches meeting at a common section which clamps the respective axial rod all the way around; wherein the common section of each of the fringes has, for carrying out the clamping, at least one cut that separates portions clamping the axial rod on opposite areas, at least one of the portions being arranged between the inner faces of the two branches.

18. The combination of claim 17, wherein the at least one cut of the common section of each of the fringes comprises a pair of cuts that separate a central portion and two side portions clamping the axial rod on opposite areas to the clamping area of the central portion.

19. A combination of the module according to claim 11 and the fringes, wherein each of the fringes is coupled to one of the axial rods and has a "U"-shaped configuration including two branches that face each other so as to have inner faces disposed face-to-face with each other, the two branches meeting at a common section which clamps the respective axial rod all the way around, wherein the common section of each of the fringes has, for carrying out the clamping, at least one cut that separates portions clamping the axial rod on opposite areas, at least one of the portions being arranged between the inner faces of the two branches.

20. The combination of claim 19, wherein the at least one cut of the common section of each of the fringes comprises a pair of cuts that separate a central portion and two side portions clamping the axial rod on opposite areas to the clamping area of the central portion.

* * * * *